United States Patent
Preda et al.

(10) Patent No.: US 7,076,483 B2
(45) Date of Patent: Jul. 11, 2006

(54) RANKING NODES IN A GRAPH

(75) Inventors: Mihai Preda, Paris (FR); Serge Abiteboul, Severes (FR)

(73) Assignee: Xyleme SA (FR)

( * ) Notice: Subject to any disclaimer, the term of this patent is extended or adjusted under 35 U.S.C. 154(b) by 861 days.

(21) Appl. No.: 09/940,132

(22) Filed: Aug. 27, 2001

(65) Prior Publication Data

US 2003/0050909 A1 Mar. 13, 2003

(51) Int. Cl.
*G06F 17/30* (2006.01)

(52) U.S. Cl. ............ 707/5; 707/4; 707/7; 707/100; 707/102; 345/419; 345/440; 709/224; 709/238

(58) Field of Classification Search .......... 707/3, 707/5, 10, 100, 102, 104.1, 2, 4, 7; 345/419, 345/440, 781, 853; 709/201, 219, 224, 238
See application file for complete search history.

(56) References Cited

U.S. PATENT DOCUMENTS

| | | | | |
|---|---|---|---|---|
| 6,008,817 A | * | 12/1999 | Gilmore, Jr. | 345/440 |
| 6,014,678 A | * | 1/2000 | Inoue et al. | 715/501.1 |
| 6,112,202 A | * | 8/2000 | Kleinberg | 707/5 |
| 6,112,203 A | * | 8/2000 | Bharat et al. | 707/5 |
| 6,216,134 B1 | * | 4/2001 | Heckerman et al. | 707/104.1 |
| 6,321,220 B1 | * | 11/2001 | Dean et al. | 707/3 |
| 6,369,819 B1 | * | 4/2002 | Pitkow et al. | 345/440 |
| 6,377,287 B1 | * | 4/2002 | Hao et al. | 345/853 |
| 6,407,739 B1 | * | 6/2002 | Wen | 345/440 |
| 6,509,898 B1 | * | 1/2003 | Chi et al. | 345/440 |
| 6,560,600 B1 | * | 5/2003 | Broder | 707/7 |
| 6,598,051 B1 | * | 7/2003 | Wiener et al. | 707/100 |
| 6,704,729 B1 | * | 3/2004 | Klein et al. | 707/5 |

OTHER PUBLICATIONS

Mukherjea, S., et al."Visualizing complex hypermedia networks through multiple hierarchical views", May 7, 1995, ACM, pp 331 337.*

* cited by examiner

*Primary Examiner*—Charles Rones
*Assistant Examiner*—Jacques Veillard
(74) *Attorney, Agent, or Firm*—Fish & Richardson P.C.

(57) ABSTRACT

A method for updating importance rank of Internet Web pages. The importance rank is used by an application. The Internet includes Hyper-links interconnecting the Web units. The method includes the step of updating the importance rank of Web pages in the internet in real time during visit of the Web pages, and applying corrective measures in order to render the graph strongly connected. Repeating the step as many times as required. The above updating of importance rank of step (a) is capable of being executed also when the Internet is changing.

20 Claims, 3 Drawing Sheets

RANKING NODES IN A GRAPH

FIELD OF THE INVENTION

The present invention is in the general field of ranking nodes in a large graph, such as, for example, ranking Web Pages in the Internet.

BACKGROUND OF THE INVENTION

The vast volume of information in the Web and the ever-increasing popularity of using the Internet as a source of information, led to a common scenario that in response to a query fed to a search engine, say Yahoo, numerous results are obtained. Thus, for example, a user who wishes to learn the Markup Language XML syntax and places the words XML and tutorial in Yahoo is likely to receive hundreds if not more of Web page results which meet this query. It is, therefore, only natural that the results will be ranked such that the most relevant ones will be displayed at the top of the result list, thus reducing the exhaustive effort involved in reviewing the list of results. To this end, there are numerous known techniques which involve various kinds of text analysis, e.g. how many times the sought word appears in the text of the Web page. The more instances of the word, the higher is the score assigned to the page. In the case of more than one search words, the resulting Web page may be e.g. tested in order to ascertain, whether the sought words are close to each other (higher score),or otherwise, are not in the same sentence or same paragraph (lower score). The latter are only simplified examples and there are known in the art other more sophisticated techniques for scoring document results by using text-related (keyword match) analysis.

Ranking documents exclusively or mainly on the basis of text analysis technologies has an inherent shortcoming in that pages that are of low or no "importance" may nevertheless be assigned with higher rank than those considered by the user as more important. For a better understanding consider the latter example of XML tutorial and further assume that IBM published and placed on the Web a user manual that includes XML tutorial chapter and that this document is successfully visited by many users and accordingly it is included in many "recommended link" lists in the Web. Naturally, the user who placed the query would expect to receive a high ranking score for this page (as compared to other pages that result from the same query) which would lead to incorporation of the link to this IBM page at the top part of the query result list. The text-based (keyword match) approaches specified above may fall short in providing this desired result insofar as the user is concerned. Thus, assume that there is another Web page (other than the specified IBM's) which contains an opinion of an unknown person on the XML and includes in one of its paragraphs a few appearances of the combination XML tutorial. This page has no practical relevance for learning XML (probably does not include actual tutorial) and is hardly visited and has almost no links thereto. However, due to the repetitive appearance of the combination "XML tutorial" in the page (as compared to, say, a single occurrence of this combination in the IBM page, i.e. only in the title), a text-based ranking approach may assign higher score to the article page as compared to the IBM page, which insofar as the user is concerned, is counter productive. Moreover, if there are many pages which are also unduly assigned with a higher score, the IBM page (which is the real page of interest insofar as the user is concerned) may be pushed down in the score list requiring the user to scroll through few screen results before arriving to the IBM result. Some users may even abandon reviewing the result list before getting to the appropriate link. Accordingly, insofar as the user is concerned, using the specified keyword match approaches may not only cause an undue delay (until the sought result is found) but may sometimes result in complete waste of time.

This significant drawback has been noticed. Accordingly, in Jon M. Kleinberg, "Authoritative Sources in a Hyperlinked Environment", Proc. of ACM-SIAM Symposium on Discrete Algorithms, 1998, (also appears as IBM Research Report RJ 10076, May 1997 and U.S. Pat. Nos. 6,112,202 and 6,112,203) an algorithm is described for ranking a set of documents based on link structure. The algorithm associates to each page an authority weight and a hub weight.

A good hub is a page that points to many good authorities; a good authority is a page that is pointed to by many good hubs.

The algorithm computes pages hub and authority scores through an iterative algorithm, working on an in-memory representation of the link graph of the pages.

Intuitively, "authority weight" indicates a so-called importance of the page. The importance of a page takes into account how many links point to the document and how "important"these documents are. The more important is the page the higher are the scores. Reverting to the latter scenario, the IBM page would get much higher scores than the article page which has only few links pointing thereto non of which being really important. This notwithstanding, the technique according to Kleinberg has a few significant shortcomings. It is designed to run on a focused and small set of pages, and not on the whole web. The algorithm operates on a relatively small number of pages, and is not scalable to the size of the web.

The reasons for this are the fact that the algorithm needs to store the link graph in main memory, and that the computations involved are relatively expensive. Moreover, it is an offline algorithm, i.e. works on a given and fixed graph, and cannot be executed while discovering the graph.

Another proposed solution which is more adequate for larger scale applications such as the Internet is described in:

S. Brin, L. Page, "The Anatomy of a Large-Scale Hypertextual Web Search Engine", Proc. 7th International World Wide Web Conference, 1998.

Sergey Brin, Lawrence Page, R. Morwani, Winograd, "The PageRank Citation Ranking: Bringing Order to the Web", Stanford Digital Library Working Paper 1998 SIDL—WP-1999-0120 (published 1998).

Taher H. Haveliwala, "Efficient Computation of PageRank", SIGMOD Stanford Technical Report, 1999.

The algorithm uses the links between web pages (i.e., the link graph) to associate to every page a value called PageRank, which indicates the authority or importance of the page.

The idea is that a page is important (high ran) if there are many pages or important pages linking to it.

The algorithm works by repeatedly multiplying a matrix describing the link graph with the vector of rank values. There are efficient ways to implement the algorithm that store the link graph on disk, thus allowing for computing the rank for large graphs (millions of pages). Nevertheless, the method requires the explicit storage of the link graph, thus requiring large amounts of storage. Also the computation is expensive for large number of pages, and it can take days or weeks to compute the ranks.

In the Google search engine introductory part (www.Google.com/technology/index.html) it is specified that "The heart of our software is PageRank(™), a system for ranking web pages developed by our founders Larry Page and Sergey Brin at Stanford University. And while we have dozens of engineers working to improve every aspect of Google on a daily basis, PageRank continues to provide the basis for all of our web search tools.

PageRank relies on the uniquely democratic nature of the web by using its vast link structure as an indicator of an individual page's value. In essence, Google interprets a link from page A to page B as a vote, by page A, for page B. But, Google looks at more than the sheer volume of votes, or links a page receives; it also analyzes the page that casts the vote. Votes cast by pages that are themselves "important" weigh more heavily and help to make other pages "important."

Important, high-quality sites receive a higher PageRank, which Google remembers each time it conducts a search. Of course, important pages mean nothing to you if they don't match your query. So, Google combines PageRank with sophisticated text-matching techniques to find pages that are both important and relevant to your search . . . "

It appears, therefore, that Google utilizes the "page importance ranking" discussed above.

This approach also suffers from significant drawbacks, as follows:

It needs to explicitly store the link graph. It takes a large amount of time and resources to compute ranks, and it is an offline algorithm.

Thus, the hitherto known techniques need to construct the link graph, for example, by storing, for each page, the list of pages it points to. Once this information is obtained and stored for all pages, the algorithm can be started. To compute the importance of a large number of pages, the algorithm will need a large amount of resources and time. When the computation is finished, there are available the results that correspond to the so stored graph. The problem is that this graph is already not be accurate anymore (as the web is dynamic, i.e. constantly changing), so it is required to run repeatedly the algorithm on the new graph.

There is, accordingly, a need in the art for substantially reducing the drawbacks of hitherto known techniques for calculating importance score of pages in the Web.

There is a further need in the art to combine the importance score of the invention with other ranking techniques such as hitherto known keyword-match techniques, so as to obtain a combined ranking scores of the Web pages.

SUMMARY OF THE INVENTION

It should be noted that whilst for convenience of explanation the invention is described with reference to ranking the importance of Web pages, those versed in the art will readily appreciate that the invention is by no means bound by this particular example. Accordingly, in the broadest aspect, the invention is useful for any application that requires to rank the importance of nodes in a large graph. Internet is, of course, large graph, but the invention is applicable to other large graphs (even if considerably smaller than the huge Internet graph).

By way of another non-limiting example, the invention is useful for the following application. Consider a graph of nodes, each being representative of an article. The links between the nodes signify citation relationship between the articles. Thus, A links to B if reference (article) B is cited in article A. In accordance with the invention, it would be possible to grade the importance of an article according to inter alia the number of articles that cite this article and their importance.

Moreover, the use of Web pages as a particular embodiment of node is a non-limiting example of a so-called web unit. Other embodiment of Web unit being, for example, a Web frame.

In the context of the invention, importance rank of a node takes into account at least the following factors: (i) how many nodes and or links point to it, and (ii) how important these nodes are, a recursive definition. Note that (i) encompasses also a function of either or both of the number of nodes and the number of links, optionally with consideration of other factors.

In accordance with the invention, there is provided a method for updating importance rank of nodes in a dynamically changing large graph; the importance ranks are used by an application; the graph includes links interconnecting the nodes; the method comprising the steps of:

a) updating the importance rank of nodes in the graph substantially in real time during visit of nodes in the graph; if said graph is not strongly connected, selectively applying corrective measures; an order of visit of nodes is prescribed by an algorithm;

b) repeating step (a) as many times as required; said updating of importance rank of step (a) is capable of being executed also when the graph is changing, and wherein an algorithm that governs the order of visit of nodes is not prescribed by said updating and applying correction steps.

Yet further, the invention provides for a method for updating importance rank of Internet Web units in an Internet; the importance ranks are used by an application; the Internet includes Hyper-links interconnecting the Web units; the method comprising the steps of:

a) updating the importance rank of Web units in the internet substantially in real time during visit of the Web units; and applying corrective measures; an order of visit of nodes is prescribed by an algorithm;

b) repeating step (a) as many times as required; said updating of importance rank of step (a) is capable of being executed also when the Internet is changing, and wherein an algorithm that governs the order of visit of nodes is not prescribed by said by said updating and applying correction steps.

The invention further provides for a method for updating importance rank of nodes in a dynamically changing graph, the importance ranks are used by an application; the graph includes links interconnecting the nodes; the method comprising the steps of:

a) storing for each node in the graph at least:
 i) short history indication representative of what happened to the node in terms of importance rank since last update;
 ii) long history indication representative of what happened to the node in terms of importance rank since a certain point of time in the past;

b) visiting nodes in the graph;

c) for each visited node, updating the importance rank of nodes by performing the steps of:
 i) in the case that said visited node has at least one child node, distributing at least substantial part of the short history indication of the visited node to the short history indication of the at least one child node;
 ii) recording at least substantial part of the short history indication of the visited node to the long history indication of the visited node and designating that said recording has been accomplished.

d) repeating steps (b) and (c) as many times as required; said steps (b) to (d) are capable of being executed also when said graph is changing, and if said graph is not strongly connected, selectively applying corrective measures.

Still further, the invention provides for a method for calculating the importance rank of nodes in a dynamically changing graph, the importance ranks are used by an application; the graph includes links interconnecting the nodes; the method comprising the steps of:
  a) providing for each node in the graph at least:
    (i) short history indication representative of what happened to the node in terms of importance rank since last update;
    (ii) long history indication representative of what happened to the node in terms of importance rank since a certain point of time in the past;
  b) selecting node in the graph;
  c) for selected node, computing the importance rank as a function of at least one of said short history indication and long history indication;
  d) repeating steps (b) and (c) as many times as required.

Yet further, the method provides for a system for updating importance rank of nodes in a dynamically changing large graph; the importance ranks are used by an application; the graph includes links interconnecting the nodes; the system comprising:
  at least one processor and associated storage configured to perform the operations that include:
    update the importance rank of nodes in the graph substantially in real time during visit of nodes in the graph; and
    if said graph is not strongly connected, said processor is configured to selectively applying corrective measures;
    the processor is configured to update said importance rank also when the graph is changing,
    and wherein an algorithm that governs the order of visiting of nodes is not prescribed by the processor update and corrective measures operations.

The invention provides for a system for updating importance rank of Web units in an Internet; the importance ranks are used by an application; the Internet includes Hyper-links interconnecting the Web units; the system comprising:
  at least one processor and associated storage configured to perform the operations that include:
    update the importance rank of Web units in the graph substantially in real time during visit of Web units in the graph; and selectively applying corrective measures;
    the processor is configured of updating said importance rank also when the Internet is changing,
    and wherein an algorithm that governs the order of visiting of Web units is not prescribed by the processor update and corrective measures operations.

The invention further provides for a system for updating importance rank of nodes in a dynamically changing graph, the importance ranks are used by an application; the graph includes links interconnecting the nodes; the system comprising:
  at least one processor and associated storage, the storage storing for each node in the graph at least:
    short history indication representative of what happened to the node in terms of importance rank since last update;
    long history indication representative of what happened to the node in terms of importance rank since a certain point of time in the past;
    the at least one processor being configured to perform the operations that include:
    a) receiving for each visited node a visiting node identification and identifications to its respective at least one child node, if any;
    b) for each visited node, updating the importance rank of nodes in said by performing the steps of:
      (i) in the case that said visited node has at least one child node, distributing at least substantial part of the short history indication of the visited node to the short history indication of the at least one child node;
      (ii) recording at least substantial part of the short history indication of the visited node to the long history indication of the visited node and designating that said recording has been accomplished.
    c) repeating operations (a) and (b) as many times as required; said operations (a) to (c) are capable of being executed also when said graph is changing,
    and if said graph is not strongly connected, said at least one processor being configured to selectively applying corrective measures.

Still further, the invention provides for a system for calculating the importance rank of nodes in a dynamically changing graph, the importance ranks are used by an application; the graph includes links interconnecting the nodes; the system comprising:
  at least one processor and associated storage, the storage storing for each node in the graph at least:
    short history indication representative of what happened to the node in terms of importance rank since last update;
    long history indication representative of what happened to the node in terms of importance rank since a certain point of time in the past;
    the at least one processor being configured to perform the operations that include:
    a. receiving selected nodes;
    b. for the selected node, computing the importance rank as a function of at least one of said short history indication and long history indication.

Yet further, the invention provides for a storage medium storing a computer implemented code for performing method steps for updating importance rank of nodes in a dynamically changing large graph; the importance ranks are used by an application; the graph includes links interconnecting the nodes; the method steps include:
  a) updating the importance rank of nodes in the graph substantially in real time during visit of nodes in the graph; if said graph is not strongly connected, selectively applying corrective measures; an order of visit of nodes is prescribed by an algorithm;
  b) repeating step (a) as many times as required; said updating of importance rank of step (a) is capable of being executed also when the graph is changing,
  and wherein an algorithm that governs the order of visit of nodes is not prescribed by said updating and applying correction steps.

The invention provides for a storage medium storing a computer implemented code for performing method steps for updating importance rank of Internet Web units in an Internet; the importance ranks are used by an application; the Internet includes Hyper-links interconnecting the Web units; the method includes the steps of:
  a) updating the importance rank of Web units in the internet substantially in real time during visit of the Web units; and applying corrective measures; an order of visit of nodes is prescribed by an algorithm;

b) repeating step (a) as many times as required; said updating of importance rank of step (a) is capable of being executed also when the Internet is changing, and wherein an algorithm that governs the order of visit of nodes is not prescribed by said by said updating and applying correction steps.

The invention further provides for a storage medium storing a computer implemented code for performing method steps for updating importance rank of nodes in a dynamically changing graph, the importance ranks are used by an application; the graph includes links interconnecting the nodes; the method include the steps of:

a) storing for each node in the graph at least:
   (i) short history indication representative of what happened to the node in terms of importance rank since last update;
   (ii) long history indication representative of what happened to the node in terms of importance rank since a certain point of time in the past;
b) visiting nodes in the graph;
c) for each visited node, updating the importance rank of nodes by performing tie steps of:
   (i) in the case that said visited node has at least one child node, distributing at least substantial part of the short history indication of the visited node to the short history indication of the at least one child node;
   (ii) recording at least substantial part of the short history indication of the visited node to the long history indication of the visited node and designating that said recording has been accomplished.
d) repeating steps (b) and (c) as many times as required; said steps (b) to (d) are capable of being executed also when said graph is changing, and if said graph is not strongly connected, selectively applying corrective measures.

Still further, the invention provides for a storage medium storing a computer implemented code for performing method steps for calculating the importance rank of nodes in a dynamically changing graph, the importance ranks are used by an application; the graph includes links interconnecting the nodes; the method comprising the steps of:

(a) providing for each node in the graph at least:
   (i) short history indication representative of what happened to the node in terms of importance rank since last update;
   (ii) long history indication representative of what happened to the node in terms of importance rank since a certain point of time in the past;
b) selecting node in the graph;
c) for selected node, computing the importance rank as a function of at least one of said short history indication and long history indication;
repeating steps (b) and (c) as many times as required.

BRIEF DESCRIPTION OF THE DRAWINGS

For a better understanding, the invention will now be described, by way of example only, with reference to the accompanying drawings, in which.

DESCRIPTION OF A PREFERRED EMBODIMENT

Figure 1:
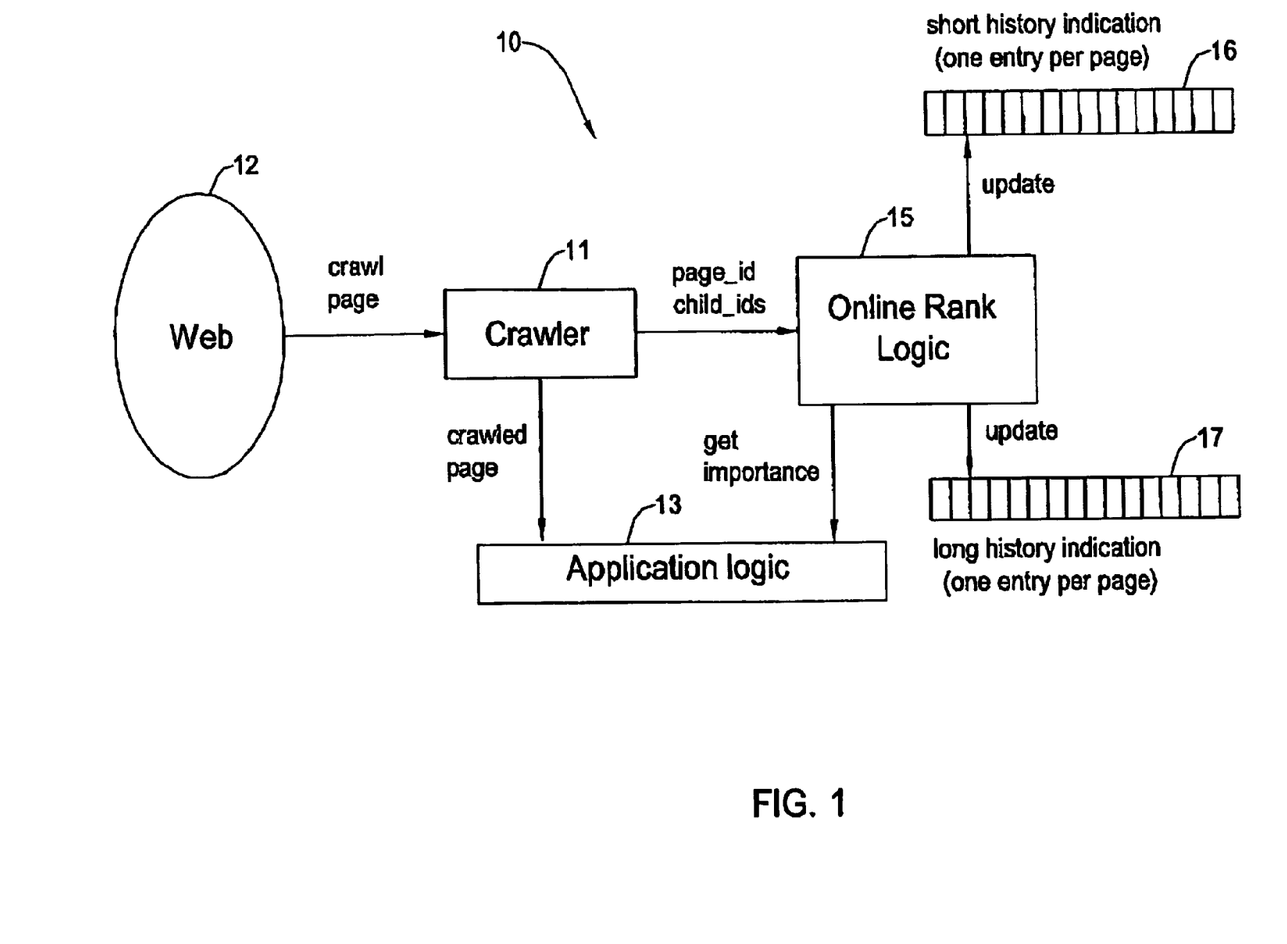
FIG. 1 illustrates a generalized system architecture in accordance with a preferred embodiment of the invention.

Attention is first directed to FIG. 1, illustrating a generalized system architecture (10) in accordance with a preferred embodiment of the invention. As shown, the system illustrates a Crawler (11) crawling the Web (designated schematically as (12)) and extracting Web pages that are fed to an application logic (13), such as a search engine that supports querying on the Web. The application typically requires to calculate importance rank (14) according to the specific need of the application, e.g. for sorting the pages that result from placing a query to the search engine according to their respective importance rank.

As will be explained in greater detail below, the importance rank is calculated in the rank logic module (15), using to this end, short history indications and long history indications, implemented, by this example, in the form of array data structures (16) and (17), storing a distinct short history and long history value (e.g. real value) for each node.

The importance rank calculation phase is well distinguished from, and asynchronous with the rank-updating phase. The system architecture describes, schematically, also the general components for the importance rank updating phase. Thus, the crawler (11) crawls the Web (12) according to a known per se crawling algorithm and the so crawled page identification along with its children Web pages identification (if any) are fed to the on-line rank logic (15) that updates, as will be explained in greater detail below, the short history indications and the long history indications data structures. The identification may be for example URLs that are converted to offset in the data structures (16) or (17).

It should be noted that whilst for convenience of explanation, a unified system architecture is described, in FIG. 1, with reference to both the importance rank update and importance rank calculation phases, the two phases are completely asynchronous one with respect to the other. They may run on separate computers and/or in different geographical sites. Accordingly, the system of the invention is not bound by the specific architecture depicted in FIG. 1 for neither the update phase nor the calculation phase. However, for convenience of explanation, the invention will be further described with reference to the architecture of FIG. 1. It should be further noted that the operation of the system of the invention are not bound to any specific system architecture. Thus, by way of example one or more processors may be utilized and processing tasks may be distributed, all as known per se.

Figure 2:
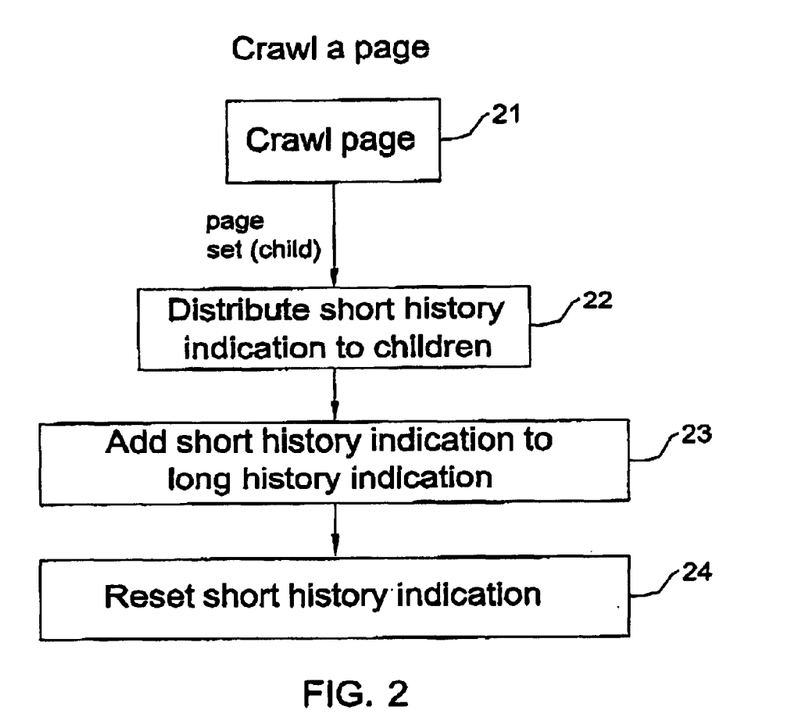
FIG. 2 illustrates a generalized flow chart of the operating steps for updating the importance rank of nodes, in the system architecture of FIG. 1.

Turning now to FIG. 2, there is shown a generalized flow chart of the operating steps for updating the importance rank of nodes, in the system architecture of FIG. 1. Thus, at the onset a crawling step (21) is performed (by crawler (11) using, to this end, known per se crawling algorithm bringing about crawled page—referred to also as visited page. (It should be noted that the visited page may be arrived at not necessarily through crawling).

The identification of the visited page and the identification of the children pages (if any) are fed to the on-line rank logic module (15) which performs the distribution and recording steps (22) and (23). In accordance with one embodiment, the on-line rank logic module (15) communicates with short history indications array (16) and long history indications array (17), where each array includes a distinct cell per node in the Web, holding e.g. a respective real value for the short history indication and long history indication.

By this specific embodiment, for each visited node (delivered e.g. from the crawling step (21)), the short history indication value (as extracted from the appropriate cell in array 16) is distributed to the short history indication cell (in array 16) of the child node (if any) and in the case of more than one child node the value is distributed, say in equal shares, to every short history indication cell (in array 16) of the children nodes. Next, the short history indication value is recorded to the long history indication value of the visited node, (as extracted from array 17), typically but not necessarily, by summing the values and storing the sum in array 17, constituting thus a new long history indication value. Next, an indication is made that the short history indication record has been accomplished, e.g. by resetting the value in the cell at array 16 that corresponds to the short history indication of the visited Web page. This procedure is repeated for any visited node.

Figure 3:
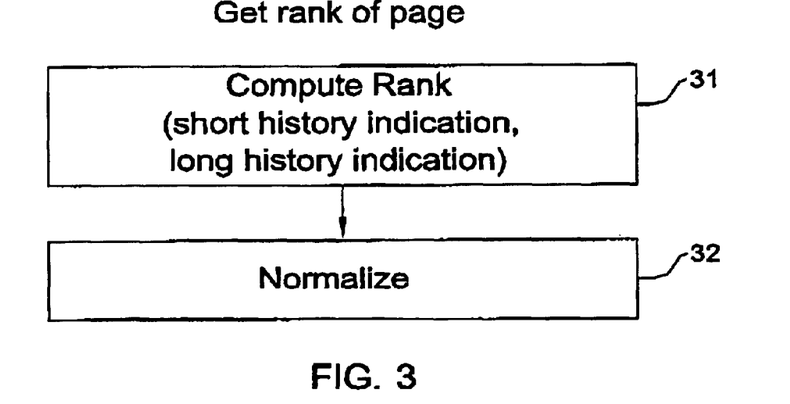
FIG. 3 illustrates a generalized flow chart of the operating steps for calculating importance rank in accordance with a preferred embodiment of the invention.
Figure 4A:
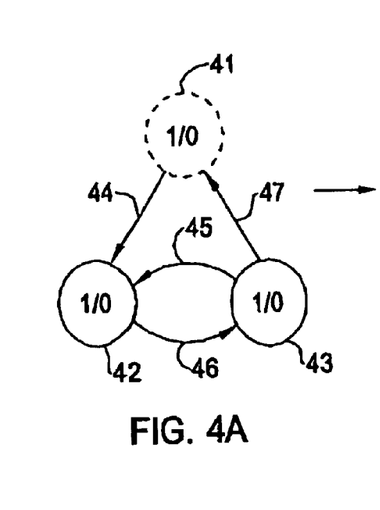
FIGS. 4A–D illustrate, schematically, a simplified numeric example that result form running the operating steps of FIG. 2, in accordance with one embodiment of the invention.
Figure 4B:
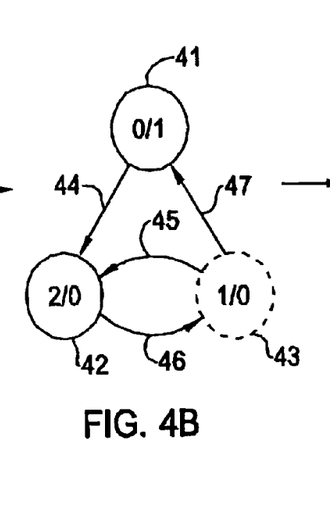
Figure 4C:
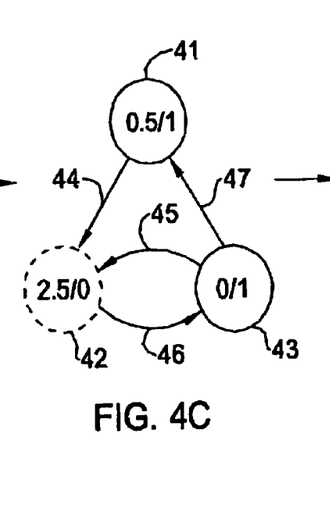
Figure 4D:
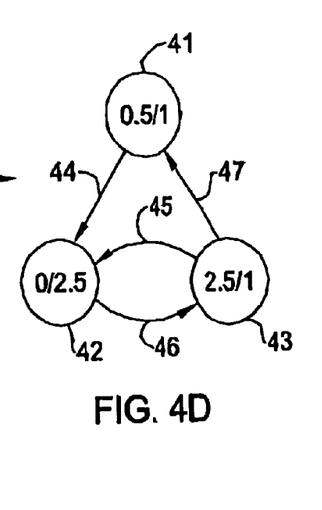

In order to exemplify the foregoing procedure, attention is now drawn to FIGS. 4A–D illustrating, schematically, a simplified numeric example that result form running the operating steps of FIG. 2, in accordance with one embodiment of the invention. Turning at first to FIG. 4A, there is shown a simple graph (40) that includes nodes 41 to 43 and links 44 to 47, interconnecting the nodes. The numbers in each node specify the short history indication value (left) and long history indication value (right). At the onset, all the short indication values are initialized to the value 1 and all the long history indication values are initialized to 0. The dotted node indicates the visited node. Thus, in accordance with step (21—FIG. 2), the crawling algorithm retrieves Web page (41) and it also delivers the links thereof, i.e. one link (44). The link is processed to arrive to Web page (42). Now, by accessing long history indication data structure (17) and short history indication data structure (16) the value of the short history indication (ice, 1) is extracted for the visited Web page (41). Next, in accordance with step 22 (FIG. 2), the value of the short indication of the visited node is distributed to the short indication value of the child node, and as readily seen in FIG. 4B, the short indication value of node (42) is incremented by 1 (i.e. to 2) and is stored in data structure (16). Next, in accordance with step (23) the value of the short history indication of the visited node is recorded to the long history indication thereof, which results, by this example, in summing the previous value of the long indication (0) and the short indication value (1), giving rise to a new value (1) that is stored in the long history indication cell (in data structure (17)—shown schematically as the right number inside node 41 in FIG. 4B). Next, in accordance with step (24) in FIG. 2, the value of the short indication of the visited node is reset (0 in node 41 in FIG. 4B). FIG. 4B further illustrates that the crawling (step 21 in FIG. 2) extracted the Web page (43) (marked with dotted background). Node (43) points to 2 children nodes (41) and (42) through links (47) and (45), respectively. Applying step (22) would result in distributing the short range indication value (1) of the visited node (43), e.g. in equal shares, to its two children nodes (i.e. 0.5 each) giving rise to new short indication values 0.5 and 2.5 respectively for the children nodes (41) and (42)—see FIG. 4C. Also, the short indication value of the visited node (1) is recorded to its long indication value (previously 0 and now 1) and the short indication value is reset (see (43) in FIG. 4C). Now, the visited node is (42) (marked in dotted background in FIG. 4C) and the procedure of distribution to its single child node (43) through link (46), recording and resetting, brings about the final state illustrated in FIG. 4D. The importance ranking for each node is calculated, by one embodiment, by simply adding the values of the short history indication value and long history indication value for each node (step 31 in FIG. 3), and the ultimate results are therefore 1.5 for node (41), 2.5 for node (42) and 3.5 for node (43). Note that by this example no normalization is applied.

The intuition of why this algorithm meets the notion of importance is as follows: the basic method of computing the importance is to distribute the importance of the parent to the children, e.g. in equal shares. This way, a page that is pointed by many pages will get more, by getting from a large number of pages. Also, a page pointed by important pages will get more, because each page will give it more. These are the ideas underlying the PageRank(™) algorithm. In accordance with the invention it is desired to perform the distribution not in an orderly manner (as is required by PageRank) but while crawling the pages and that the result to be significantly independent of the frequency of visit of pages or the order of visits. To this end the short history information is used.

Consider the example of an important page, crawled once a week. This page is important, and this means that there are many pages pointing to it, and/or important pages pointing to it. So, during one week, chances are that a significant number of pages that point to the focus page are crawled, so the short history value of the focus page will get high. When we crawl the focus page itself (once in a week) it will have a big short history value, which will get distributed to its children. So, its children will benefit, at their turn, from the fact of being pointed to by an important page.

Now, consider a different scenario: let's say that the focus page is crawled much more frequently, say once every hour. During the one-hour period, much less pages pointing to the focus page are crawled than during one week, so the short history value for the focus page will be much lower. When we crawl the focus page, the value distributed to its children will correspondingly be lower, but this is compensated that the children will get this smaller increment every hour, instead of once a week. Essentially, changing the crawl frequency on our focus page does not change its computed importance or the computed importance of its children.

Take also the case of an unimportant page. There are just few pages pointing to it, and they are not important pages. Consider that the focus page is crawled once a week. During this period much fewer pages pointing to it are met than in the case of the important page above. So, the short history value for this page will be low each time, and this will reflect in a low long history value and low computed rank.

Consider now a page pointing to the focus page. If this page is crawled very often (with high frequency) the focus page will get every time low increments. If we crawl this page seldom, the focus page will get higher increments but less often. Again this does not significantly affect the computed importance of the focus page. Note that this specific intuitive explanation is provided for clarity only and is by no means limiting the use of the invention to a wide range of applications and the use of different embodiments.

Note that the in the preferred embodiment where the short history indication value is distributed, during visit, to the children nodes the accuracy of updating and calculating the importance rank is not affected by the visiting frequency. Thus, consider for example, in case of frequent visits, the short history indication value has not accumulated much between visits (say 6 units between the first visit at time T1 and the second visit at time T2, meaning that during the second visit the 6 units are distributed to the two children—3 to each; and 4 units between the second visit at time T2 and third visit at time T3, meaning that during the third visit the 4 units are distributed to the two children—2 to each). Substantially the same result would be obtained in a less frequent scenario, say, first visit in T1 and second visit at T3, during which the short history indication value has accumulated 10 units (and possibly some additional fraction if at all), which are divided during the second visit at T3, 5 to each child (in the case that no additional fraction has been added).

Note that in the context of the invention, the term "during visit" should be construed in a broad manner, e.g. not only the time of arrival to the node but encompassing the activities that relate to the so arrived node.

In order for the proposed technique of the invention to work properly the graph should, preferably, be strongly connected. There are typical embodiments, such as the Web where the graph is not strongly connected and, therefore, some corrective measures need to be taken. By a non-limiting example, the corrective measures being instead of distributing the entire value of the short history indication to the respective values of the children node only substantial portion thereof is distributed, say 80%. The remaining part of the short history indication value (i.e. in the latter example 20%) are distributed to the respective short history indication values of other nodes in the graph, say e.g. in equal shares. The other nodes in the graph being nodes in the graph other than the visited node and the children nodes. Thus, for example, reverting to FIG. 4, only 0.8 (being 80% of the sort indication value of node (41)) is distributed to node 42 (being the one child thereof) and 20% (i.e. 0.2) are distributed to the other nodes (by this example node 43—which is neither the visited node nor the child node). By another non-limiting example, the remaining portion may be distributed to all nodes including the visited and the child nodes thereof. Other corrective measures techniques in lieu or in addition to the one described above may be employed, all as known per se.

Note, that the specified steps are independent of the visiting strategy that is selected. Thus, in the case of crawling, the specified procedure may be executed for wide range of crawling algorithms. This is in contrast to the importance ranking algorithm specified in the Brin, Page 1998 publication (as discussed in the background of the invention section) where the importance ranking algorithm prescribes the visiting strategy of the nodes. Note that in this example visiting is not crawling. Moreover, the procedure of the invention may be preformed whilst the Web is changing, and there is no need to freeze the state of the Web (say, by taking a snapshot or performing an off-line computation) in order to run the algorithm. Still further, it is noted that the update of the importance rank can be done substantially in real time whilst visiting the Web page. Thus, by way of non-limiting example, consider the specific embodiment described above. The update step requires only few accesses to the long and short indication data structures, and processing of only the links that originate from the visited node (in order to identify the children nodes that are subject to distribution) which poses only small computational overhead and therefore regarded as substantially real time whilst visiting the node. In contrast, the Brin, Page algorithm, referred to above, requires accessing a large data structure (or data structures) that store considerable number of links and therefore requires extensive processing time for updating the importance rank and therefore cannot be considered as being performed in real time.

There now follows a description of a preferred embodiment for calculating the importance rank of the nodes with reference to FIG. 3. As explained above, by a preferred embodiment, for each node there is a short history indication and a long history indication. By a specific embodiment of the latter, the specified data structures are implemented in a form of cells in arrays that hold value (e.g. real value) for either one of the short and long history. Now, a node for which the importance rank is of interest is selected and the importance ran thereof is calculated as a function of either or both of the short and long indications (possibly considering also other factors) (31 in FIG. 3). In the latter specific embodiment, both the short and long indication values are considered and the function is simply the summation of the two values. The result of employing this approach was demonstrated with reference to FIG. 4D above. Other examples of functions being, e.g. employing weights which assign higher weight for the recent developments (short history) rather than the long history.

The invention is by no means bound by the embodiments described above (with reference to either one of the updating and calculating modes) and various alternative embodiments are applicable, There follows a description of few non limiting modified embodiments Thus, the invention is not bound to the Web. However insofar as Web applications are concerned, whereas visiting nodes is preferably achieved by means of crawling, this is by no means binding. For example, some of the Web pages may be visited by look-up of a table of a look data structure.

For the embodiment of the invention where long history indication is used, the indication may be determined, depending upon the particular application. For example, from a certain point in the past until the time that the node has recently been visited. Alternatively, by defining a time interval from a certain point in the past to another (later) point in the past. By way of another example more than one time interval in the past may be utilized. The latter may be utilized, e.g. to determine the evolution of the importance of the page.

The invention is not bound by the use of specific application and any application which requires the use of importance ranking of nodes in a graph is applicable.

Thus, by way of example, it would be desired to rank the importance of the pages that result from placing a query to a search engine and sort the result inter alia by considering the importance. The advantages of using the importance ranking in providing sorted query results have been demonstrated by the Google search engine, discussed in the Background of the invention section, above.

If desired, the importance ranking may be combined with other ranking techniques to obtain composite ranking and sort the result according to the composite ranking, e.g. by taking into account known per se text-based ranking. The precise manner of combination e.g. weighting or other techniques, may be determined all as required and appropriate, depending upon the particular application. A typical, yet not exclusive, example of other ranking is ranking that takes into account one or more members from the following group that includes:

the contents (e.g. how close are the sought words one to the other)

link contents (i.e. the appearance of the sought words in the link)

URL text length, i.e. the longer the text the lower the score

Other non-text based ranking may also (or in addition) be used, e.g. one or more members from the following group that includes:

frequently used links get higher score text size, highlighting, e.g. large and/or highlighted words get higher score personalization, e.g. depending upon the characteristics of the user and her interest.

These are only examples, and other may be used in addition or instead.

The specified other ranking is, of course, not bound to the use of query application.

If desired, the importance rank updating (and/or calculating) may be confined to a sub-graph according to a predetermined criterion such as e.g. pages located in a specific country.

In the above described embodiments, the distribution of values was in equal shares (see, e.g. the description with reference to the example in FIGS. 4A–D). It should be noted that this is by no means limiting. Thus, by another embodiment the distribution is in not in equal shares, using, to this end, a distribution criterion, e.g. links that point to different pages contribute higher value than links pointing to the same page, and/or link that point to the same page (i.e. self pointer) contributing lower value (if at all) and/or links pointing to other pages within the same Web site (i.e. intra-site links—say, within the Microsoft site) contribute less value than inter-site links (say, a link that interconnects a page in Microsoft site to a page in Lucent site).

Insofar as the importance rank calculation is concerned, by one embodiment it may be a function of the long history indication per se or both.

There follows a description that attempts to get the intuition of short history and long history values.

The short history value represents how much a page received from pages pointing to it since it was last crawled. Let's suppose the focus page is crawled once every day, say at the end of the day.

As there is no restriction on the crawl order, it may happen that one day a lot of pages pointing the focus page are crawled, while the next day just a few of them are crawled. So, the short history value of the focus page will be high when crawling it at the end of the first day, but will be low when we crawl it at the end of the second day. Such variations are not related to the importance of the focus page. The long history value is used to factor out such variations, by integrating the short history value over a given period of time. In the previous example, one might consider as a long history value the sum of successive short history values during one week. The assumption when choosing this period is that a significant part of the pages that point to the focus page have been crawled during this period. Now it is noted the tradeoff involved in the choice of the length of the long history: when using a longer period, the computed importance values are more stable (less fluctuation), but sensibility to recent graph modifications diminishes; in the case of a shorter period, the computed ranks are more reactive to graph changes, but there might also be irrelevant fluctuations.

So the application can customize in what proportion to use the short history and long history, and over what time period to compute the long history.

Note that this specific intuitive explanation is provided for clarity only and is by no means limiting the use of the invention to a wide range of applications and the use of different embodiments.

The simplified function used in the example above considered the sum of both. By a modified embodiment the function takes into account a bias factor, discussed above. If desired, other factors may also be taken into account e.g. in order to emphasis a more updated information.

Other variants for the function are applicable, all as required and appropriate.

If desired, the so calculated importance rank may be normalized (step 32 in FIG. 3), e.g. by dividing the importance rank value for a node by the total sum of importance values for all the nodes in the graph, e.g. for yielding a value between 0 and 1.

The invention is, of course, not bound by the search engine application, and other applications which utilize importance ranking of nodes are applicable. Thus, for example, is accordance with another non-limiting Web related application, the importance rank is used to modify the visiting strategy of the nodes e.g. the crawling algorithm, such that the higher the importance rank the more frequent is the visit.

The invention is of course not bound to Web related applications.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

In the claims the follow, Alphabetic characters and Roman symbols are used for convenience only and do not necessarily imply any particular order on the method steps.

The present invention has been described with a certain degree of particularity, but those skilled in the art will readily appreciate that various alterations and modifications may be carried out without departing from the scope of the following Claims:

What is claimed is:

1. A method for updating importance rank of Internet Web units in an Internet; the importance ranks are used by an application; the Internet includes Hyper-links interconnecting the Web units; the method comprising the steps of:
    a) updating the importance rant of Web units in the Internet substantially in real time during visit of the Web units; and applying corrective measures; an order of visit of nodes is prescribed by an algorithm;
    b) repeating step (a) as many times as required; said updating of importance rank of step (a) is capable of being executed also when the Internet is changing, and wherein an algorithm that governs the order of visit of nodes is not prescribed by said updating and applying correction steps;
    obtaining other rank of the Web units; and
    combining said importance rank and other rank for each Web unit giving rise to a composite rank of the respective Web unit.

2. The method according to claim 1, wherein said updating is conned to selected Web units in the Internet, constituting a sub-graph of the internet.

3. The method according to claim 1, wherein said other rank being a text based rank.

4. A method for calculating the importance rank of nodes in a dynamically changing graph, the importance ranks are used by an application; the graph includes links interconnecting the nodes; the method comprising the steps of:

a) providing for each node in the graph at least:
  (i) short history indication representative of what happened to the node in terms of importance rank since last update;
  (ii) long history indication representative of what happened to the node in terms of importance rank since a certain point of time in the past;
b) selecting node in the graph;
c) for selected node, computing the importance rank as a function of at least one of said short history indication and long history indication;
d) repeating steps (b) and (c) as many times as required, wherein said graph includes the Internet or portion thereof, said links being hyperlinks, said nodes being Web units, and wherein said application includes a search engine, and further comprising the step of:
  placing a query;
  said step (b) includes selecting Web units in response to said query; and further comprising:
  sorting selected Web units on the basis of at least their importance rank; and displaying information that pertains to the Web units, the information includes Web units internet address (URL), in a display order according to the respective Web units sorted importance rank.

5. The method according to claim 4, further comprising the steps of:
  obtaining other rank of the Web units;
  combining said importance rank and other rank for selected node, giving rise to a composite rank of the respective selected Web unit; said sorting step includes:
  sorting the selected Web units on the basis of at least their respective composite rank; and
  displaying information that pertains to the Web units, the information includes Web units internet address (URL), in a display order according to the respective Web units sorted composite rank.

6. A method for calculating the importance rank of nodes in a dynamically changing graph, the importance ranks are used by an application; the graph includes links interconnecting the nodes; the method comprising the steps of:
a) providing for each node in the graph at least:
  (iii) short history indication representative of what happened to the node in terms of importance rank since last update;
  (iv) long history indication representative of what happened to the node in terms of importance rank since a certain point of time in the past;
b) selecting node in the graph;
c) for selected node, computing the importance rank: as a function of at least one of said short history indication and long history indication;
d) repeating steps (b) and (c) as many times as required, wherein said graph includes the Internet or portion thereof, said links being hyperlinks, said nodes being Web units, and further including: sorting visited Web units on the basis of at least their importance rank; and
said application modifying visiting strategy which prescribe which Web units are selected in said step (b), such that the higher the importance rank the more often the Web unit is visited.

7. A system for updating importance rank of nodes in a dynamically changing large graph; the importance ranks are used by an application; the graph includes links interconnecting the nodes; the system comprising:
  at least one processor and associated storage configured to perform the operations that include:
    update the importance rank of nodes in the graph substantially in real time during visit of nodes in the graph; and
    if said graph is not strongly connected, said processor is configured to selectively applying corrective measures;
    the processor is configured to update said importance rank also when the graph is changing,
    and wherein an algorithm that governs the order of visiting of nodes is not prescribed by the processor update and corrective measures operations.

8. A system for updating importance rank of Web units in an Internet; the importance ranks are used by an application; the Internet includes Hyper-links interconnecting the Web units; the system comprising:
  at least one processor and associated storage configured to perform the operations that include:
    update the importance rank of Web units in the graph substantially in real time during visit of Web units in the graph; and selectively applying corrective measures;
    the processor is configured of updating said importance rank also when the Internet is changing,
    and wherein an algorithm that governs the order of visiting of Web units is not prescribed by the processor update and corrective measures operations.

9. A system for updating importance rank of nodes in a dynamically changing graph, the importance ranks are used by an application; the graph includes links interconnecting the nodes; the system comprising:
  at least one processor and associated storage, the storage storing for each node in the graph at least:
  short history indication representative of what happened to the node in terms of importance rank since last update;
  long history indication representative of what happened to the node in terms of importance rank since a certain point of time in the past;
  the at least one processor being configured to perform the operations that include:
a) receiving for each visited node a visiting node identification and identifications to its respective at least one child node, if any;
b) for each visited node, updating the importance rank of nodes in said by performing the steps of:
  (i) in the case that said visited node has at least one child node, distributing at least substantial part of the short history indication of the visited node to the short history indication of the at least one child node;
  (ii) recording at least substantial part of the short history indication of the visited node to the long history indication of the visited node and designating that said recording has been accomplished;
c) repeating operations (a) and (b) as many times as required; said operations (a) to (c) are capable of being executed also when said graph is changing,
  and if said graph is not strongly connected, said at least one processor being configured to selectively applying corrective measures.

10. The system according to claim 9, wherein said graph being Internet graph, nodes being Web units and links being Hyper-links.

11. The system according to claim 9, wherein said short history indications being an array of cells each holding a real value signifying a short history indication value of a respective node in the graph, and said long history indications being an array of cells each holding a real value signifying a long history indication value of the respective node in the graph.

12. A system for calculating the importance rank of nodes in a dynamically changing graph, the importance ranks are used by an application; the graph includes links interconnecting the nodes; the system comprising:

at least one processor and associated storage, the storage storing for each node in the graph at least:

short history indication representative of what happened to the node in terms of importance rank since last update;

long history indication representative of what happened to the node in terms of importance rank since a certain point of time in the past;

the at least one processor being configured to perform the operations that include:

a. receiving selected nodes;

b. for the selected node, computing the importance rank as a function of at least one of said short history indication and long history indication.

13. The system according to claim 12, wherein a short history indication value constituting said short history indication and long history indication value constituting said long history indication; said function being the sum of said short history indication value and long history indication value.

14. The system according to claim 13, wherein the at least one processor being further configured to normalize the so calculated sum.

15. The system according to claim 14, wherein said at least one processor being further configured to sorting the selected Web units on the basis of at least their importance rank.

16. The system according to claim 12, wherein said graph includes the Internet or portion thereof, said links being hyperlinks, said nodes being Web units, and wherein said application includes a search engine, and wherein said at least one processor being further configured to:

receiving selected Web units in response to said query and providing their calculated importance rank.

17. A storage medium storing a computer implemented code for performing method steps for updating importance rank of nodes in a dynamically changing large graph; the importance ranks are used by an application; the graph includes links interconnecting the nodes; the method steps include:

a) updating the importance rank of nodes in the graph substantially in real time during visit of nodes in the graph; if said graph is not strongly connected, selectively applying corrective measures; an order of visit of nodes is prescribed by an algorithm;

b) repeating step (a) as many times as required; said updating of importance rank of step (a) is capable of being executed also when the graph is changing, and wherein an algorithm that governs the order of visit of nodes is not prescribed by said updating and applying correction steps.

18. A storage medium storing a computer implemented code for performing method steps for updating importance rank of Internet Web units in an Internet; the importance ranks are used by an application; the Internet includes Hyper-links interconnecting the Web units; the method includes the steps of:

a) updating the importance rank of Web units in the internet substantially in real time during visit of the Web units; and applying corrective measures; an order of visit of nodes is prescribed by an algorithm;

b) repeating step (a) as many times as required; said updating of importance rank of step (a) is capable of being executed also when the Internet is changing, and wherein an algorithm that governs the order of visit of nodes is not prescribed by said by said updating and applying correction steps.

19. A storage medium storing a computer implemented code for performing method steps for updating importance rank of nodes in a dynamically changing graph, the importance ranks are used by an application; the graph includes links interconnecting the nodes; the method include the steps of:

a) storing for each node in the graph at least:

(i) short history indication representative of what happened to the node in terms of importance rank since last update;

(ii) long history indication representative of what happened to the node in terms of importance rank since a certain point of time in the past;

b) visiting nodes in the graph;

c) for each visited node, updating the importance rank of nodes by performing the steps of:

(i) in the case that said visited node has at least one child node, distributing at least substantial part of the short history indication of the visited node to the short history indication of the at least one child node;

(ii) recording at least substantial part of the short history indication of the visited node to the long history indication of the visited node and designating that said recording has been accomplished;

d) repeating steps (b) and (c) as many times as required; said steps (b) to (d) are capable of being executed also when said graph is changing, and if said graph is not strongly connected, selectively applying corrective measures.

20. A storage medium storing a computer implemented code for performing method steps for calculating the importance rank of nodes in a dynamically changing graph, the importance ranks are used by an application; the graph includes links interconnecting the nodes; the method comprising the steps of:

(a) providing for each node in the graph at least:

(i) short history indication representative of what happened to the node in terms of importance rank since last update;

(ii) long history indication representative of what happened to the node in terms of importance rank since a certain point of time in the past;

b) selecting node in the graph;

c) for selected node, computing the importance rank as a function of at least one of said short history indication and long history indication; repeating steps (b) and (c) as many times as required.

* * * * *

UNITED STATES PATENT AND TRADEMARK OFFICE
CERTIFICATE OF CORRECTION

| | | |
|---|---|---|
| PATENT NO. | : 7,076,483 B2 | Page 1 of 1 |
| APPLICATION NO. | : 09/940132 | |
| DATED | : July 11, 2006 | |
| INVENTOR(S) | : Preda et al. | |

It is certified that error appears in the above-identified patent and that said Letters Patent is hereby corrected as shown below:

On the title page,

[*] Notice: Subject to any disclaimer, the term of this patent is extended or adjusted under 35 USC 154(b) by (861) days Delete the phrase "by 861" and insert -- by 815 days--

Signed and Sealed this

Thirty-first Day of July, 2007

JON W. DUDAS
*Director of the United States Patent and Trademark Office*